(12) United States Patent
Publicover et al.

(10) Patent No.: US 11,941,185 B1
(45) Date of Patent: Mar. 26, 2024

(54) SYSTEMS AND METHODS TO INTERACTIVELY CONTROL DELIVERY OF SERIAL CONTENT USING A HANDHELD DEVICE

(71) Applicant: KINOO, Inc., Mountain View, CA (US)

(72) Inventors: Nelson George Publicover, Bellingham, WA (US); Lewis James Marggraff, Lafayette, CA (US)

(73) Assignee: Kibeam Learning, Inc., Oakland, CA (US)

( * ) Notice: Subject to any disclaimer, the term of this patent is extended or adjusted under 35 U.S.C. 154(b) by 0 days.

(21) Appl. No.: 18/091,274

(22) Filed: Dec. 29, 2022

(51) Int. Cl.
*G06F 3/0346* (2013.01)
*G06F 3/01* (2006.01)
*G06F 3/038* (2013.01)
*G06F 3/16* (2006.01)
*G10L 25/78* (2013.01)

(52) U.S. Cl.
CPC ............ *G06F 3/0346* (2013.01); *G06F 3/017* (2013.01); *G06F 3/038* (2013.01); *G06F 3/167* (2013.01); *G10L 25/78* (2013.01); *G06F 2203/0384* (2013.01)

(58) Field of Classification Search
CPC ........ G06F 3/0346; G06F 3/017; G06F 3/038; G06F 3/167; G06F 2203/0384; G10L 25/78
See application file for complete search history.

(56) References Cited

U.S. PATENT DOCUMENTS

| | | | |
|---|---|---|---|
| 2008/0070682 A1* | 3/2008 | Woody | A63F 13/428 463/43 |
| 2020/0356608 A1* | 11/2020 | Ogawa | G06N 20/00 |
| 2021/0004680 A1* | 1/2021 | Publicover | G06V 20/30 |
| 2021/0390364 A1* | 12/2021 | Marggraff | H04N 21/43076 |

* cited by examiner

*Primary Examiner* — Grant Sitta
(74) *Attorney, Agent, or Firm* — William A. English; Vista IP Law Group LLP

(57) ABSTRACT

Systems and methods are described in which user reactions to one or more interactions initiated by a handheld device are a basis for controlling the broadcasting of serial content on a content delivery device such as a television or tablet. Interactions initiated on the handheld device may include visual, acoustic and/or haptic components based on the one or more contexts of concurrent (i.e., current or recently broadcast) or ensuing (i.e., not yet broadcast) content. User reactions may be determined based on device movements or orientations (sensed by a camera or inertial measurement unit), verbal replies (sensed by a microphone), and/or push-button indications. Based on user reactions and/or predetermined preferences, serial content may be replayed, paused, bypassed, played in slow-motion, or played in a so-called "fast forward" mode. Systems and methods may provide simple and intuitive methods to control serial content delivery that may be particularly well-suited for young children.

18 Claims, 7 Drawing Sheets

SYSTEMS AND METHODS TO INTERACTIVELY CONTROL DELIVERY OF SERIAL CONTENT USING A HANDHELD DEVICE

TECHNICAL FIELD

The present application relates generally to systems and methods for an individual to perform machine-based interactions using a handheld electronic device. Although the handheld device may be used by anyone, it may be particularly well-suited for use by a young child, utilizing simple interactive signalling that lacks requirements for precision manual dexterity and/or understanding complex interactive sequences. Systems and methods herein employ techniques within the fields of computer programming, electronic design, firmware design, inertial measurement units (IMUs), accelerometers, magnetometers, ergonometric construction, device controls, human motor control and human-machine interactions. Systems and methods may provide a user, especially a young child, with a familiar machine interface to instinctively and/or confidently control the viewing of, and/or listening to, serial content.

BACKGROUND

In recent years, the world has become increasingly reliant on portable electronic devices that have become more powerful, sophisticated and useful to a wide range of users. However, although children may rapidly embrace using some aspects of electronics designed for more experienced users, young children may benefit from having access to interactive electronic devices that are small, light-weight, colorful, playful, informative, ergonomically designed for a child (including being child-safe), and easy to use. The systems and methods disclosed herein make use of recent advances in the fields of both large scale and portable displays, sound generation in room settings as well as on mobile devices where miniature coil speakers (or piezoelectric speakers and/or haptic units) may be employed, inertial measurement units (sometimes also referred to as inertial motion units) and telecommunications.

Two-dimensional visual displays may be composed of any number of monochromatic or multi-colored, addressable light-sources or pixels. Displays may range from a single light source (e.g., illuminating an orb, transmitted via a waveguide), to those that are capable of displaying a single number (e.g., seven-segment display) or alphanumeric character (e.g., a five-pixel by eight-pixel array), to high-resolution screens with tens of millions of pixels. Regardless of scale, displays are typically implemented as: 1) a two-dimensional array of light sources (most frequently some form of light-emitting diodes (LEDs) including organic LEDs (OLEDs), or 2) two plates of polarized glass that sandwich liquid crystal material (i.e., forming a liquid crystal display, LCD) that responds to an electric current to allow different wavelengths of light from one or more illumination sources (i.e., a backlight) to pass.

Speakers associated with televisions, theater rooms and other stationary venues when listening to serial content generally employ one or more electromagnetic moving coils. Multiple speakers (e.g., often differing in size and/or locations relative to a listener) may help to generate spatial hearing and/or more faithfully reproduce a full spectrum of audible sounds. Within handheld and/or mobile devices, the vibrations of a miniature speaker are generally produced using similar electromagnetic coil approaches or piezoelectric (sometimes referred to as "buzzer") designs. Vibrations (e.g., particularly those associated with a visual or acoustic alert) may also be generated by a haptic unit (also known as kinesthetic communication). Haptic units generally employ an eccentric (i.e., unbalanced) rotating mass or piezoelectric actuator to produce vibrations (particularly at the low end of the audio spectrum) that can be felt.

Inertial measurement unit (IMU), accelerometer and/or magnetometer tracking may incorporate any or all combinations of: 1) linear accelerometers measuring forces generated during movement (i.e., governed by Newton's second law of motion) in up to three axes or dimensions, 2) gyroscope-based sensing of rotational rates or velocities in up to three rotational axes, 3) magnetometers measuring magnetic field (i.e., magnetic dipole moment) including fields generated by the earth, and/or 4) the gravitational pull of the earth (including gravitational orientation) by measuring forces on an internal mass. The accuracy of IMUs, accelerometers and magnetometers vary widely, depending on size, operating range, compensating hardware that may be used for correction of measurements (affecting cost), environmental factors including thermal gradients, the availability of individual device calibrations, and times required to perform measurements (including integration times for some types of measurements).

Advances in both electronics (i.e., hardware), standardized communications protocols and allocation of dedicated frequencies within the electromagnetic spectrum have led to the development of a wide array of portable devices with abilities to wirelessly communicate with other, nearby devices as well as large-scale communications systems including the World Wide Web and the metaverse. Considerations for which protocols (or combinations of available protocols) to employ within such portable devices include power consumption, communication range (e.g., from a few centimeters to hundreds of meters and beyond), and available bandwidth.

Currently, Wi-Fi (e.g., based on the IEEE 802.11 family of standards) and Bluetooth (managed by the Bluetooth Special Interest Group) are used within many portable devices. Less common and/or older communications protocols within portable devices in household settings include Zigbee, Zwave, and cellular- or mobile phone-based networks. In general (i.e., with many exceptions, particularly considering newer standards), compared with Bluetooth, Wi-Fi offers a greater range, greater bandwidth and a more direct pathway to the internet. On the other hand, Bluetooth, including Bluetooth Low Energy (BLE), offers lower power, a shorter operational range (that may be advantageous in some applications), and less complex circuitry to support communications. Control of televisions, projectors and other devices used to deliver serial content over a short range (e.g., within a room or home) most commonly employ infrared (IR) or radio frequency (e.g., capable of control absent a direct line-of-sight) components of the electromagnetic spectrum.

Advances in miniaturization, reduced power consumption and increased sophistication of electronics, including those applied to displays, IMUs, micro electro-mechanical systems (MEMS) and telecommunications have revolutionized the mobile device industry. Such portable devices have become increasingly sophisticated, allowing users to concurrently communicate, interact, geolocate, monitor exercise, track health, be warned of hazards, capture videos, perform financial transactions, and so on.

Systems and methods that facilitate simple and intuitive interactions with a handheld device, particularly for use by children, may be useful.

SUMMARY

In view of the foregoing, systems and methods are provided herein that describe a light-weight, simple-to-use and intuitive handheld device that may be particularly well-suited for machine-based interactions by a young child. Although the device may, in part, be accepted by a child as a toy, the computational flexibility embedded within the device may allow the device to be used as a means for play, embodied learning, emotional support, cognitive development, communications, expressing creativity, developing mindfulness and enhancing imagination. Additionally, a portable, light-weight, "fun" handheld device may motivate physical movement by a child (and adults) including kinetic and kinesthetic activities.

According to one aspect, devices, systems and methods are provided for a handheld device to control delivery of serial content to one or more broadcast devices based on one or more interactions between the handheld device and an individual. A content broadcast device may comprise a tablet, television, speaker system, headphones, augmented reality headset, large-format display screen, the handheld device, and so on. Serial content may include one or more audio programs (e.g., podcast, audio book, speech, music), visual presentations (e.g., video images, series of still images, slide presentation, virtual book), and/or combined audiovisual presentations (e.g., television show, movie, streaming media, instructional video, virtual book accompanied by audio). Additionally, during serial content delivery, broadcast modes may change over time (e.g., listening to a piece of music followed by an audiovisual presentation regarding the music).

Within further examples, an interaction based on the context of concurrent (i.e., current or recently broadcast) or ensuing (i.e., available to a machine, but not yet broadcast to a user) serial content may be initiated by the handheld device. A user response or reaction to the interaction may then be used as a basis for the handheld device to transmit one or more instructions to control delivery of the serial content. For example, the broadcasting of a previously presented segment of serial content may be repeated, content broadcast concurrent with the interaction may be allowed to continue (or paused), content may be played or re-played in "slow-motion", and/or content not yet broadcast may be bypassed or broadcast in a so-called "fast forward" fashion (e.g., by repeatedly and/or periodically eliminating content segments from the broadcast process).

Handheld device components to initiate and/or generate an interaction (i.e., "outputs" with respect to the handheld device) may include one or more of: 1) one or more display components broadcasting one or more illumination sources or light patterns including colored light sources, 2) one or more speakers broadcasting one or more sounds (e.g., words, sound effects, music), and 3) one or more haptic units generating vibrations that may be felt by a handheld device user. Alternatively, or in addition, an interaction with a device user may be initiated or signalled by simply pausing delivery of serial content. In such cases, a handheld device user may be aware of (and subsequently react to) content context(s) concurrent with the pausing of content delivery.

An interactive response or reaction by a handheld device user may subsequently be sensed and/or detected (i.e., as "inputs" with respect to the handheld device) by one or more of: 1) one or more IMUs sensing one or more of a movement, translational movement pattern (e.g., sensed primarily using one or more accelerometers), repeated translational movement pattern, rotational movement (e.g., primarily sensed using one or more gyroscopes), rotational movement pattern, repeated rotational movement pattern, tapping the handheld device (e.g., using an opposing hand finger), striking the handheld device against a solid object (e.g., table), orientation of the handheld device relative to the gravitational pull of the earth, and/or orientation of the handheld device relative to the magnetic field of the earth (that may be distorted by magnetic sources and/or particularly ferromagnetic structures in the vicinity of the device user); 2) a microphone that may sense sounds (e.g., most commonly words or phrases) produced by the device user; 3) one or more pushbutton or contact sensors activated by the device user, 4) one or more cameras that are components of the handheld device to sense location, orientation and/or movement relative to other objects in the environment of the user; and 5) one or more cameras that are external to the handheld device that may sense location, orientation and/or movement of the handheld device relative to other objects in the environment of the device user.

Interactions between the handheld device and the device user may simply involve queries of likes and dislikes regarding the concurrent and/or ensuing contexts. For example, if image processing of concurrent streaming content were to identify an object such as a cat, then the handheld device may initiate an interaction by asking "Do you like cats?" A strongly affirmative answer may result in the handheld device causing images of cats to be replayed. Along similar lines, if a negative reaction were classified in response to the question "Do you like snakes?", then the handheld device may direct the content delivery device to bypass ensuing (i.e., not yet broadcast) content containing images and/or sounds of snakes. As contexts, sounds and/or objects are identified within serial content, scripted interrogations may be used within the handheld device to determine desire (or lack of desire) to view, replay, and/or listen to content segments.

Within additional examples, machine learning and/or artificial intelligence (AI) methods may be employed to direct handheld device interactions regarding serial content, subsequently used as a basis for controlling content delivery. Such exchanges may assess, for example, whether the user is paying attention to content, bored, knowledgeable about content, capable of reproducing demonstrated content (e.g., playing a musical instrument), wanting to be entertained, wanting to learn, and so on.

In addition to direct responses or reactions of a device user, handheld device control of delivery of serial content may take into account a range of additional considerations such as classified context(s) of already viewed content (e.g., compared with concurrent context(s) to help avoid boredom), previously expressed reactions (both positive and negative) related to concurrent or ensuing contexts (e.g., including contextual objects), known interests or phobias of the device user, predefined preferences of the user, predefined preferences specified by a third party (e.g., parent or guardian), knowledge of the age of the user to ensure broadcasting of age-appropriate materials, the time of day (e.g., approaching the normal bedtime of a child), and so on.

As noted above, a number of different modes of responses (e.g., gesture, orientation, tapping) may be detected by a handheld device via an inertial motion unit (IMU). Different designs and/or manufacturers of IMUs may optionally include one or more magnetometers within core IMU modules. Modern, chip-based measurements of force including those produced by gyroscopes, accelerometers, an internal mass and/or magnetometers typically employ MEMS techniques; however, in some cases, magnetometer-based measurements in particular may be implemented within separate modules (e.g., with their own electronic interface) or within subsystem modules (e.g., electronically slaved) to a primary IMU module. Along similar lines, force measurements in different dimensions (e.g., generally about orthogonal axes) may be implemented using separate electronic modules, for example, affixed to device arms where forces in one or more directions may be greater (e.g., compared with medial locations). Within descriptions herein, IMU data refer to any combinations of measuring forces in one or more axes generated by one or more accelerometers, gyroscopes, internal masses (e.g., sensing gravity) and/or magnetometers (i.e., even if implemented within multiple distinct electronic modules).

In accordance with an example, a method is provided to control delivery of serial content based on human interaction with a handheld device, the method comprising providing the handheld device operated by a human that includes a device processor, a device speaker operatively coupled to the device processor, a device inertial measurement unit operatively coupled to the device processor, and a device communication module operatively coupled to the device processor, wherein the device communication module controls delivery of the serial content to a content delivery device that is one or both of viewable and audible by the human; initiating, by one of the device communication module and a content delivery device processor of the content delivery device, the delivery of the serial content to the content delivery device; determining, by one or both of the device processor and the content delivery device processor, one or more serial content contexts based on one or both of concurrent serial content concurrent with the delivery of the serial content to the human and ensuing serial content available for delivery to the human after the concurrent serial content; broadcasting, by the device speaker, one or more interaction sounds related to the one or more serial content contexts; acquiring, by the device inertial measurement unit, human interaction data; determining, by the device processor, that the human interaction data include one or more human reactions to the one or more interaction sounds; and generating, by the device communication module, one or more instructions to control the delivery of the serial content based on the one or more human reactions.

In accordance with another example, a method is provided to control delivery of serial content based on human interaction with a handheld device, the method comprising providing the handheld device operated by a human that includes a device processor, a device display operatively coupled to the device processor, a device inertial measurement unit operatively coupled to the device processor, and a device communication module operatively coupled to the device processor, wherein the device communication module controls delivery of the serial content to a content delivery device that is one or both of viewable and audible by the human; initiating, by one of the device communication module and a content delivery device processor of the content delivery device, the delivery of the serial content to the content delivery device; determining, by one or both of the device processor and the content delivery device processor, one or more serial content contexts based on one or both of concurrent serial content concurrent with the delivery of the serial content to the human and ensuing serial content available for delivery to the human after the current serial content; displaying, on the device display, one or more illumination patterns related to the one or more serial content contexts; acquiring, by the device inertial measurement unit, human interaction data; determining, by the device processor, that the human interaction data include one or more human reactions to the one or more illumination patterns; and generating, by the device communication module, one or more instructions to control the delivery of the serial content based on the one or more human reactions.

In accordance with a further example, a method is provided to control delivery of serial content based on human interaction with a handheld device, the method comprising providing the handheld device operated by a human that includes a device processor, a device speaker operatively coupled to the device processor, a device microphone operatively coupled to the device processor, and a device communication module operatively coupled to the device processor, wherein the device communication module controls delivery of the serial content to a content delivery device that is one or both of viewable and audible by the human; initiating, by one of the device communication module and a content delivery device processor of the content delivery device, the delivery of the serial content to the content delivery device; determining, by one or both of the device processor and the content delivery device processor, one or more serial content contexts based on one or both of concurrent serial content concurrent with the delivery of the serial content to the human and ensuing serial content available for delivery to the human after the concurrent serial content; broadcasting, by the device speaker, one or more interaction sounds related to the one or more serial content contexts; acquiring, by the microphone, human interaction data; determining, by the device processor, that the human interaction data include one or more human reactions to the one or more interaction sounds; and generating, by the device communication module, one or more instructions to control the delivery of the serial content based on the one or more human reactions.

In accordance with yet a further example, a method is provided to control delivery of serial content based on human interaction with a handheld device, the method comprising providing the handheld device operated by a human that includes a device processor, a device inertial measurement unit operatively coupled to the device processor, and a device communication module operatively coupled to the device processor, wherein the device communication module controls delivery of the serial content to a content delivery device that is one or both of viewable and audible by the human; initiating, by one of the device communication module and a content delivery device processor of the content delivery device, the delivery of the serial content to the content delivery device; determining, by one or both of the device processor and the content delivery device processor, one or more content frequencies within one or both of audio components and video components of the serial content; acquiring, by the device inertial measurement unit, human interaction data; determining, by the device processor, one or more human movement frequencies present within the human interaction data; determining, by the device processor, one or more human reactions based on whether the one or more content frequencies and the one or more human movement frequencies are one or both of approximately synchronous and approximately the same frequency; and generating, by the device communication module, one or more instructions to control the delivery of the serial content based on the one or more human reactions.

Other aspects and features including the need for and use of the present invention will become apparent from consideration of the following description taken in conjunction with the accompanying drawings.

BRIEF DESCRIPTION OF THE DRAWINGS

A more complete understanding may be derived by referring to the Detailed Description when considered in connection with the following illustrative figures. In the figures, like-reference numbers refer to like-elements or acts throughout the figures. Presented examples are illustrated in the accompanying drawings, in which.

DETAILED DESCRIPTION

Figure 1:
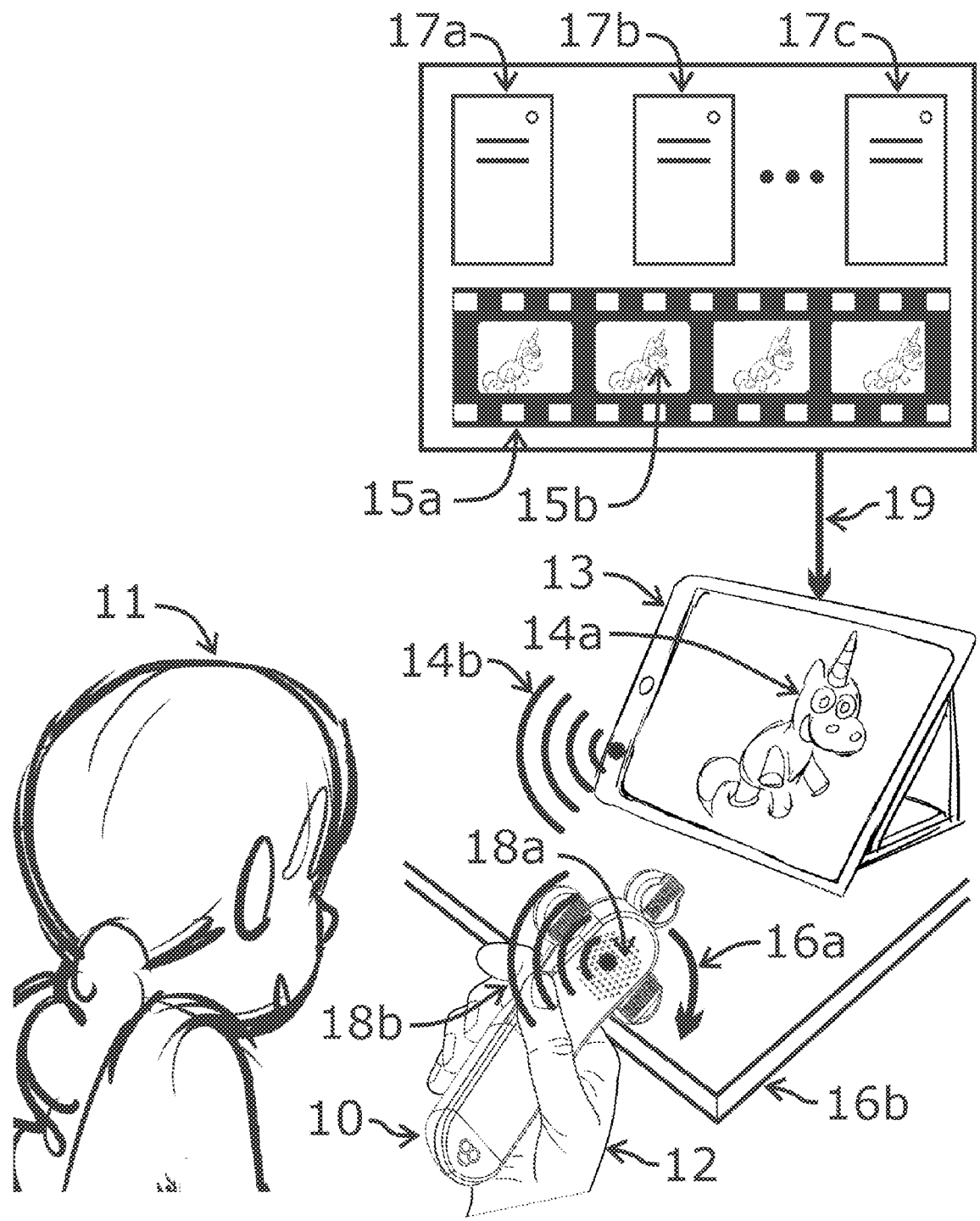
FIG. 1 shows serial content delivered from a remote server cluster to a tablet device viewed by a young child who controls content delivery by reacting to audio prompts about content generated by a handheld device via strikes of the handheld device against a desktop.

Before the examples are described, it is to be understood that the invention is not limited to particular examples described herein, as such may, of course, vary. It is also to be understood that the terminology used herein is for the purpose of describing particular examples only, and is not intended to be limiting, since the scope of the present invention will be limited only by the appended claims.

Unless defined otherwise, all technical and scientific terms used herein have the same meaning as commonly understood by one of ordinary skill in the art. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

According to one aspect, devices, systems and methods are provided for a handheld device to control delivery of serial content on a content delivery device based on one or more interactions with a handheld device user. The one or more interactions generated by the handheld device include one or more contexts classified within the serial content. A content delivery device may be one or more of a television, large-format screen, tablet, mobile device, display screen, projection device, holographic display, augmented reality headset, set of headphones, earbuds, speakers, and so on.

Serial content may comprise an audiovisual presentation in the form of a movie, television show, instructional video, cartoon animation, virtual book (e.g., that, optionally, may be accompanied by an actual book or magazine), supplemental content associated with an actual book or magazine, audiovisual recording (e.g., by a family member or friend), and so on. Movies and other content may be composed of fictional materials, non-fiction materials, or mixtures of both. Such presentations may appear to contain continuous motion(s) to a viewer (e.g., video), or consist of a series of individual images, each displayed for a period of time designed to promote comprehension. Audio components may include recordings of sounds normally found in nature, or sounds generated by a device, machine or instrument (that may, or may not, be manipulated by a human). Audio components may include spoken words, music, sound effects, recorded sounds, sounds produced by animals, sounds of ocean waves, startling prompts, and so on.

Within further examples herein, serial content may comprise only visual components of a presentation, only aural components, audiovisual components, or segments of serial content that transition back-and-forth to be purely visual, only audio, or both. So-called "slide presentations", silent movies and closed-captioned displays are examples of serial content that may contain only viewable components. Podcasts, radio broadcasts, audio recordings (e.g., by a parent or guardian), and so-called "audio books" are examples of serial content containing only audio components.

One or more serial content contexts may be determined based on content that is being, or that has recently been, broadcast (i.e., concurrent content) or serial content that may be available (e.g., to one or more delivery and/or handheld device processors), but that has not yet been broadcast (i.e., ensuing content) to a handheld device user. Classifying one or more visual contexts of serial content (i.e., whether concurrent or ensuing) may involve computer vision steps that include: 1) identifying bounding areas for individual objects within a scene, 2) using image recognition (typically involving convolution neural networks) to identify individual objects within each bounding area, and 3) combining the identities and/or frequency of identifying objects within a scene to determine one or more scene contexts.

Along similar lines, classifying one or more audio contexts may involve computational linguistics steps that include: 1) speech recognition (typically involving feedforward and recurrent neural networks) that may (optionally) include language translation, 2) natural language processing, and 3) combining identified words, phrases (including vocal emphasis and/or their frequency of use) and/or other sounds (e.g., musical tunes, animal sounds, alerting sounds, noise) to determine one or more scene contexts.

Additionally, within further examples herein, classified visual and audio content may be considered together within processes to determine one or more serial content contexts. For example, if an automobile were identified within a visual content scene and the word "car" (or other synonym) identified within a concurrent soundtrack, then a focal context of the segment of serial content likely involves automobiles.

The initiation and sustaining of interactions on the handheld device may involve visual displays (e.g., via one or more light sources or small screens), acoustic prompts (e.g., via an embedded speaker) and/or haptic stimuli (via an embedded haptic unit). Additionally, a handheld device interaction may also begin (i.e., as an interaction prompt) by simply pausing the delivery of content on the serial content delivery device.

The ability to use a number of different handheld device output components and corresponding modalities to generate prompts coupled to a number of different handheld device input components and their corresponding modalities to sense user responses, results in a number of combinations of minimal hardware configurations for different forms of user interactions. For example, a prompt might use one or more displays to generate an illumination pattern and acquire user reactions based on movement pattern, device tap, or device orientation sensed using an embedded IMU. Similarly, an audible prompt may be generated using a handheld device speaker while reactions are detected using an embedded microphone. Operation of the handheld device may even depend solely on context within the serial content (and/or pausing content delivery) to prompt a response (i.e., absent initially using handheld device output hardware). The following table summarizes four output (i.e., with respect to the handheld device) modes and five input modes, for a (multiplicative) total of twenty minimal handheld device combinations of input and output components that may be utilized during interactions.

TABLE 1

Combinations of handheld device components to generate prompts and sense user responses or reactions.

| Device Output (modality) | Device Input (modality) |
|---|---|
| display (illuminated light pattern) | inertial motion unit (movement) |
| speaker (sound) | microphone (sound) |
| haptic unit (vibration) | pushbutton (force and/or contact) |
| none (pause serial content) | handheld device camera (images) |
| | external camera (tracking handheld device) |

Within further examples herein, methods to initiate and/or guide handheld device interactions may include scripted (e.g., pre-established sequences, that may include conditional dependencies) visual display and/or audio sequences. If the symbol "[context]" is used to represent a classified context (using processes described above), then exemplary scripted prompts that may be presented (visually, aurally and/or haptically) to initiate an interaction by the handheld device include:
  Do you like [context]?
  Would you like to see more [context]?
  Did you see the [context]?
  How did the [context] happen?
  When did the [context] happen?
  Who is the actor who played [acting context]?
  What is the answer to [mathematical context]?
  Where is [geographic context]?
  Do you recognize the tune [musical context]?
Based only on ensuing context, an interaction may include:
  Would you like to see a [ensuing context]?
  Are you afraid of [ensuing context]?
Without specifically referencing a concurrent or ensuing context, an interaction may include:
  Are you bored?
  Do you want to stop?
If only visual prompts are generated by the handheld device (e.g., via a display), an interaction may include:
  How do you say [context]?
  What sound does a [context] make?
If only auditory prompts are generated by the handheld device (e.g., via a speaker), an interaction may include:
  How do you spell [context]?
  What color is a [context]?
If haptic prompts are included by the handheld device, a visual or aural interaction may include:
  Do you recognize the beat in [musical context]?
Alternatively, or in addition to scripted interactions, methods in the field of natural language generation (NLG) may form a basis for interaction and exchange using the handheld device. Such NLG techniques are generally driven by a machine learning (e.g., artificial intelligence, AI) framework and may be deployed in conjunction with visual and/or haptic handheld device components. NLG may take into account concurrent and/or ensuing contexts, as well as interactive responses (i.e., in real time) by the device user using natural language understanding (NLU) methods. Both NLU and NLG are generally regarded as components within the field of natural language processing (NLP).

Further, the device processor may include a "personality" driven by AI (i.e., artificial intelligence personality, AIP). An AIP may enhance user interactions with the handheld device by including a familiar appearance and/or voice that typically include personal insights (e.g., likes, dislikes, preferences) about the device user. Human-machine interactions enhanced by an AIP are more fully described in U.S. Pat. No. 10,915,814, filed Jun. 15, 2020, and U.S. Pat. No. 10,963,816, filed Oct. 23, 2020, the entire disclosures of which are expressly incorporated herein by reference. Determining context from audiovisual content and subsequently generating conversation by a virtual agent based on such context(s) are more fully described in U.S. Pat. No. 11,366,997, filed Apr. 17, 2021, the entire disclosure of which is expressly incorporated herein by reference.

Interaction sounds generated by one or more handheld device speakers may include one or more of a word, phrase, sentence, question, interjection, utterance, animal sound, alerting sound, sound effect, song, musical beat, musical tune, musical score, soundtrack and mimicking sound within the serial content. Audio responses and/or reactions (e.g., during scripted or AIP-based interactions) may be sensed using one or more handheld device microphones. The intent of a device user may subsequently be classified using NLP-based methods based on words, phrases, sentences, utterances, intonations, elevated or reduced voice volume, elevated or reduced voice pitch and/or other aspects of natural speech. As described in more detail below, classified verbal responses may be combined with other considerations (e.g., user likes and dislikes) to determine user intent(s) regarding the display of serial content.

Within further examples herein, one or more human reactions expressing sadness, distress, and/or fear about concurrent or ensuing serial context(s) may be classified based on verbal responses (and other modes of responding, when available). Classifications may also be made regarding understanding the serial content context, indications of not understanding context, laughing at content, expressing anger, expressing happiness and/or expressing surprise about the serial content. Classification of intent based on NLP (and other intent classification) methods may result in the transmission of instructions by the handheld device to one or more serial content broadcast devices to control delivery of serial content including replay, pausing, re-starting or skipping content.

Alternatively, or in addition to NLP-based reactions, handheld device user responses may include several modalities sensed by an IMU. Manipulations may include translational motion, tapping the device, rotation, and/or orientation of the device relative to the magnetic and/or gravitational pull of the earth. As introduced in the Background and Summary sections above, IMU data streams may include of one or more of:

1. up to three channels (i.e., representing three orthogonal spatial dimensions typically denoted X, Y and Z) of accelerometer data,
2. up to three channels (i.e., representing rotation around 3 axes often denoted pitch, roll and yaw) of gyroscope rotational velocities,
3. up to three channels (i.e., representing orientation in three orthogonal dimensions) of magnetometer data representing magnetic forces (e.g., including the magnetic pull of the earth), and
4. up to three channels (i.e., representing orientation in three orthogonal dimensions) of inertial forces on an internal mass data that may include the gravitational pull of the earth.

Conversion of analog IMU data into a digital form, suitable for processing, may use analog-to-digital (A/D) conversion techniques, well-known in the art. IMU sample rates may generally be in a range from about 100 samples/second to about 10,000 samples/second where (as introduced in the Background section, above) higher IMU sample rates involve trade-offs involving signal noise, cost, power consumption and/or circuit complexity. Motion gesture responses by a user may require sample rates in the lower end of the range just described whereas, as described further below, determining the presence of a tap-based user response (e.g., using a finger to tap the handheld device or tapping the handheld device against a solid surface), and particularly determining the location of such a tap on the body of the handheld device, generally requires sample rates in the upper end of the range just described.

Figure 5:
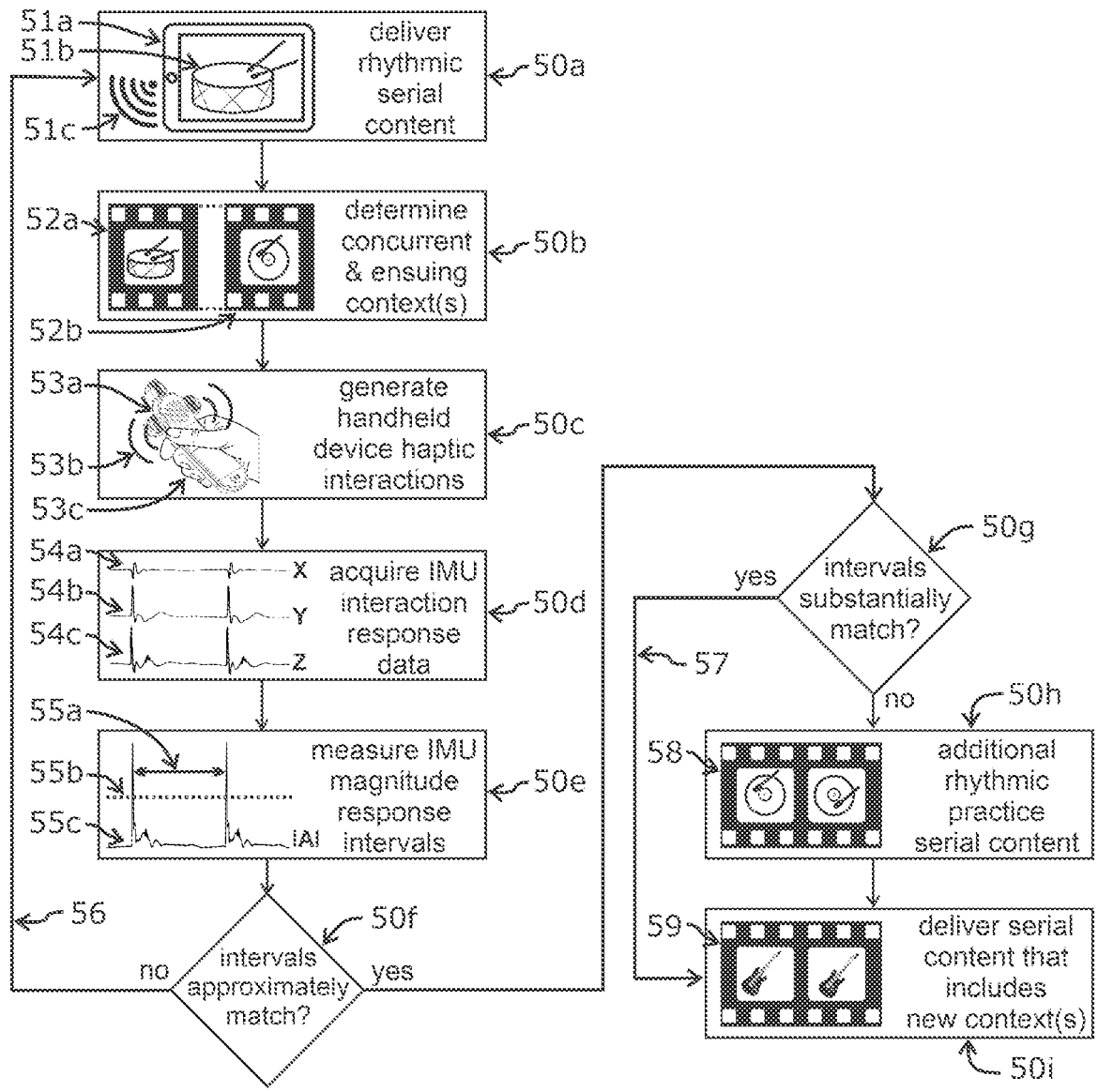
FIG. 5 is a flow diagram illustrating exemplary interactions that include haptic vibrations on a handheld device synchronized with the sounds and images of a drum shown on a tablet device to determine if the IMU-sensed movements of the handheld device are synchronous with the drum beat, or if additional practice demonstrating rhythmic awareness on percussion musical instruments might be required.

As illustrated in FIG. 5 at 50$d$, data from three-axis accelerometers may be considered a time-varying vector in three-dimensional space where each axis may be denoted X, Y and Z. Within FIG. 5, accelerometer measurements for each axis were sampled at 6,667 samples/second. Treating accelerometer data as a vector, the magnitudes of accelerations, |A|, are also shown in FIG. 5 at 50$e$, computed according to $$|A| = \sqrt{(X_i - X_b)^2 + (Y_i - Y_b)^2 + (Z_i - Z_b)^2} \quad \text{(eqn. 1)}$$

where $X_i$, $Y_i$ and $Z_i$ represent accelerometer samples (i.e., where "i" represents sample index) in each of the three dimensions; and $X_b$, $Y_b$ and $Z_b$ represent so-called "baseline" values in each of the same three dimensions. Baseline values may take into account factors such as electronic offsets of electronics and may be determined during periods (e.g., by computing average values to reduce the effects of noise) when there is no movement. Three-dimensional acceleration directions (e.g., using spherical, Cartesian and/or polar coordinate systems) may also be computed from such data streams. Analogous approaches may also be made based on multi-dimensional IMU gyroscope data streams and computing pointing vectors toward the gravitational and/or magnetic pull of the earth.

Within further examples herein, user intent may be indicated based on one or more movements sensed by one or more embedded IMUs. Such movements may be used to indicate relatively simple intents (e.g., a "yes" or "no" reaction) or more nuanced intents (e.g., indicating a degree of fear or uncertainty). Resultant instructions for the handheld device to control serial content delivery are described in more detail below. Within relatively simple user reaction examples, a "yes" response may cause serial content to continue to be broadcast, "no" may pause delivery, and ascertaining that a level of fear is above a threshold may result in skipping ensuing content. Intent(s) may, for example, be signalled by:

1. motion of any sort (e.g., above IMU noise levels),
2. movement in a particular direction,
3. velocity (e.g., in any direction) above a threshold value,
4. a gesture using the handheld device (e.g., known movement pattern),
5. pointing the handheld device in a predetermined direction,
6. tapping the handheld device with a digit of an opposing hand,
7. tapping the handheld device with a striking object (e.g., stylus),
8. striking the handheld device against a solid object (e.g., desk), and/or
9. striking the handheld device against an additional handheld device.

Within further examples, a shaking of the handheld device may be identified based on frequency components of device movement (e.g., measured using Fourier transformation techniques). Limited by human physiological performance, shaking may be identified as containing frequencies up to about four Hertz (where higher than this range up to about twelve Hertz is generally considered a pathological tremor). Shaking the handheld device may be in any direction or alternatively, shake direction and/or orientation may be used to indicate specific user intents such as "yes" or "no", as just described.

In yet further examples of user response modalities, by processing IMU data streams, a "tap" or nudge of the handheld device may be identified as a result of intentionally moving and subsequently causing an object (i.e., a "striking object") to hit a location on the surface of a handheld device (i.e., "tap location") targeted by the user. A tap may be generated by the device user by tapping a holding hand digit onto the handheld device, tapping an opposing hand onto the handheld device, tapping an opposing hand digit onto the handheld device, tapping a human body part onto the handheld device, or tapping the handheld device onto a solid object. A striking object may, for example, also be a stylus, a stick, a pencil or other moveable object.

The locations of such taps may be computed when a stationary handheld device is struck by a moving object (e.g., a digit of the hand opposing the hand holding the device), when the handheld device itself is moved to strike another object (e.g., table, see FIG. 1), or when both the striking object and the handheld device are moved simultaneously prior to contact. Tap locations may be determined using distinctive "signatures" or waveform patterns (e.g., peak force, acceleration directions) within IMU data streams (i.e., particularly accelerometer and gyroscopic data) that are dependent on tap location. IMU data streams prior to and following the tap may help to determine whether a striking object was used to tap a stationary device, the device was forcefully moved toward another object, or both processes occurred simultaneously. Determining tap location on the surface of a handheld device based on inertial (i.e., IMU) measurements and subsequent control of activities based on tap location are more fully described in co-pending U.S. application Ser. No. 17/874,253, filed Jul. 26, 2022, the entire disclosure of which is expressly incorporated herein by reference.

Differing user indications may be classified by identifying different tap locations and/or (particularly acceleration) forces on the handheld device (e.g., tapping a center display in FIG. 2 at 25b indicating "yes" versus tapping the main body of the handheld device to indicate "no"), tapping different objects (e.g., tapping with a relative "soft" surface finger to indicate "yes" while tapping the handheld device against a hard surface such as a desk to indicate "no"), and/or distinguishing different gesture movements (e.g., movements in a clockwise direction to indicate "yes" and movements in a counter-clockwise direction to indicate "no"). By determining gesture directions and/or tap modes (e.g., forceful versus light tap), different responses (e.g., "yes", "no") may be indicated.

Although the sensing of selection indications based on IMU data streams may eliminate a need for a pushbutton and/or other sensor, this does not imply a need to eliminate symbols, or contact points on the handheld device. Indeed, images of pushbuttons or any other symbols (e.g., crosshair) may be applied to (e.g., painted on) surfaces of the handheld device at different potential tap locations. For example, catering particularly to young children, different tap locations may be indicated by brightly colored bullseye (or other symbols or shapes) on the surface of the handheld device. Optionally, such symbols may be applied using temporary adhesives (i.e., including as so-called "stickers") that may be exchanged for different user applications or simply for fun as a child ages and/or develops different personal preferences.

Alternatively, or in addition, the timing of individual or repeated reactions by the device user to serial content and/or interactions initiated by the handheld device may be a component of classifying responses or reactions. The timing of responses may be particularly applicable when there are one or more repeated or rhythmic components within serial content and/or device interactions. Such rhythmic components may be broadcast within a musical score, flashing light(s), rotating wheel, clapping by one or more individuals, repeated chirping by a bird, image or scene changes, and so on.

Responses acquired by the handheld device using one or more modalities (e.g., verbal sensed by a microphone, motion sensed by an IMU, contact sensed via pushbutton) that are about the same frequency as broadcast rhythmic components suggest that the user is at least aware of rhythmic components. Responses with a similar frequency but that are asynchronous with broadcast rhythms may trigger a replay of serial content to reinforce rhythmic awareness.

Responses acquired by the handheld device using one or more modalities that are synchronous with the broadcast rhythmic components suggest that the user is fully aware and following rhythmic content. In such cases, content may continue to be broadcast as long as there is synchrony (suggesting enjoyment) or, for example, during serial content involving musical instruction, further instruction with the same melody or instrument may be bypassed.

Coupled to real-time responses or reactions of a device user, classification processes for the control by the handheld device of the delivery of serial content may take into account a range of additional considerations. Examples include:

1. If concurrent and/or ensuing contexts are the same or similar to one or more contexts that have previously been broadcast, handheld user interactions may (optionally) include pointing out such similarities and subsequently skipping repetitive content (e.g., helping to avoid boredom or inattention).
2. Reactions to current context(s) may be assessed in light of previously expressed (positive and/or negative) reactions to similar contexts (e.g., helping to avoid repetitive questioning).
3. Known (i.e., to the handheld device) interests, hobbies or teachings may trigger broadcasting, skipping or re-broadcasting selected content.
4. Known (i.e., to the handheld device) dislikes, fears or phobias of the device user may trigger skipping of content segments or a warning (e.g., verbal and/or using handheld display indicators) that such content is about to be broadcast.
5. Device control of content to broadcast or avoid may include consideration of predefined preferences and/or contexts to be blocked by the device user or a third party (e.g., parent or guardian).
6. Known (i.e., to the handheld device) geographic location may influence the broadcasting of content, particularly those involving different languages, traditions, local contexts, and/or cultural norms.
7. Particularly during instructional broadcasts, known (i.e., to the handheld device) attributes of the device user (e.g., age, educational level, language skills) may influence broadcast selection(s).

Within additional examples, an elapsed time taken to react to a pausing of serial content delivery and/or an initial (or subsequent) prompt generated on the handheld device may be used as a further element of controlling serial content delivery. For example, a prolonged reaction time may be viewed as an indication of boredom, ambivalence or inattention, suggesting that a change in serial content context (i.e., terminating the broadcast of current context) may be in order. Such reaction timing may be deliberate (i.e., where the device user intentionally times when one or more reactions occur) or unforced (i.e., where a prompt-response or selection interval may be measured by the device in a manner that is unknown to the user).

Response times may also be compared to additional (e.g., so-called "wall clock") reference times to further modulate or control one or more actions. As an example, serial content that encourages active participation (e.g., exercise, moving about) might be encouraged via handheld device prompts during selected times of the day (e.g., not immediately after a mealtime). As a further example, whether to initiate the display of serial content containing several new contexts may depend on the time the response was made relative to a calendar event (e.g., a pending departure by a child or a supervising adult) or a usual bedtime for a young child.

The handheld device may additionally include one or more photodiodes, an optical blood sensor, and/or an electrical heart sensor, each operatively coupled to the device processor. These handheld device components may provide additional components (i.e., inputs) to help determine the control of serial content delivery. For example, a data stream from a heart rate monitor may indicate stress or duress during the viewing of certain serial content contexts. Based on past interactions, current levels of detected stress, and/or predefined user preferences, the broadcasting (i.e., controlled by the handheld device) of content containing such contexts may be limited, delayed or completely avoided.

The handheld device may optionally include one or more cameras or other light sensors (e.g., scanners, bar code readers). Such one or more light sensors may be used to determine one or more environmental contexts including persons and/or objects (i.e., real or virtual) in the vicinity of the handheld device user while interacting with and/or viewing serial content. As an example, a camera may determine the presence of a companion (e.g., sibling, parent, guardian) in the room. The detected presence of a companion may result in the handheld device restricting the delivery of serial content to not broadcast content disclosing personal information or, conversely, to broadcast (or time the broadcast of) content that may appear scary, distressing or confusing absent a supportive confidante.

The physical location and/or movement of a handheld device as well as its orientation in (three-dimensional) space may be enhanced by external camera-based tracking of the handheld controller (i.e., where such cameras are not components of the handheld device) during at least some times when in use. Camera-based measures of handheld controller position (e.g., orientation in the field-of-view of the camera including relative to other objects in the field-of-view, velocity, acceleration) and/or movement may be combined with IMU-based data streams (that generally do not provide accurate measures of absolute location relative to other objects in a user's environment) to provide an enhanced basis for handheld device interactions.

Camera-based measures of position in space, when available, may "update" IMU-based estimates of movements in space (that generally use numerical integration techniques to convert IMU-based accelerations into velocities and/or locations). Systems and methods to determine such camera-based measures are described in U.S. Pat. No. 11,334,178, filed Aug. 6, 2021 and U.S. Pat. No. 11,409,359, filed Nov. 19, 2021, the entire disclosures of which are expressly incorporated herein by reference.

Within further examples herein, the classification of user intent(s) during one or more interactions may result in the transmission of instructions from the handheld controller to one or more serial content broadcast devices to enact any of a range of serial content controls. For example, one or more segments of previously presented content may be re-broadcast, or instructions to "rewind" content may restart the content delivery process. The progression of content may be reversed (i.e., played backwards in time). Content broadcast concurrent with the interaction may be stopped or allowed to continue, and/or content that has not yet been broadcast may be bypassed.

Content may be played, replayed or played backwards: 1) in real time, 2) in accelerated time or so-called "fast forward" mode (e.g., by periodically eliminating content segments from the broadcast process), or 3) in slow motion or expanded time (e.g., by reducing the frame update rate). During broadcasts that include audio in which time is expanded or contracted, audio frequencies and/or periods of silence may be adjusted to assist verbal comprehension using techniques that are known in the art.

Within additional examples, although not "handheld" in a strict sense, such portable electronic devices may be affixed and/or manipulated by other parts of the human body. A device that interacts with a user to control the presentation of serial content may, for example, be affixed to an arm, leg, foot or head. Such positioning may be used to address accessibility issues for individuals with restricted upper limb and/or hand movement, individuals lacking sufficient manual dexterity to convey intent, individuals absent a hand, and/or during situations where a hand may be required for other activities.

Additionally, the generation of visual and/or auditory interactions on the handheld device may take into account accessibility factors by some device users. For example, particular colors and/or color patterns may be avoided within visual cues when devices are used by individuals with different forms of color blindness. Similarly, if an individual has a hearing loss over one or more ranges of audio frequencies, then those frequencies may be avoided or boosted in intensity (e.g., depending on the type of hearing loss) within audio cues generated by the handheld device.

During activities that, for example, involve young children or individuals who are cognitively challenged, interactions may involve significant "guessing" and/or needs to guide a device user. Assisting a user during an interaction and/or relaxing the precision of expected responses may be considered a form of "interpretive control". Interpretive control may include "nudging" (e.g., providing intermediary hints) toward one or more target responses or reactions. For example, a young child may not fully understand how to manipulate a handheld device to attain the appearance of a specific character on a display. During such interactions, auditory instructions may accompany the character selection process (e.g., broadcasting "hold the wand straight up"), guiding the individual toward a selection.

Similarly, a flashing display and/or repeating sound (where frequency may be related to how close a cue or attribute is to a particular selection) may be presented as a user approaches a selection (e.g., an anticipated response). On the other hand, a reaction in which there is no apparent indication of a preference regarding broadcasting of serial content may be accompanied by a "questioning" indication (e.g., buzzing sound), to prompt additional interaction. Further aspects of interpretive control are more fully described in U.S. Pat. No. 11,334,178, filed Aug. 6, 2021, and U.S. Pat. No. 11,409,359 filed Nov. 19, 2021, the entire disclosures of which are expressly incorporated herein by reference.

FIG. 1 is an example of a scenario in which serial content 15a is delivered via one or more telecommunications methods 19 by a remote server cluster 17a, 17b, 17c to a tablet device 13 that may be viewed 14a and/or listened to 14b by a young child 11. Content delivery is controlled following one or more interactions between the child and a portable device 10 held in the child's right hand 12. At the time of viewing and/or listening by the child 11 in FIG. 1, the serial content 15a comprises cartoon images (e.g., at 15b) and/or sounds 14b of a unicorn 14a moving across the tablet screen 13.

At the time of interruption to initiate an interaction, sights 14a and/or sounds 14b from the tablet 13 may optionally be paused and audible communication 18b to the young child 11 may be initiated by the handheld device 10. Sounds 18b emanating from the handheld device 10 may include topics related to the concurrent context(s) of serial content (i.e., being broadcast or recently broadcast) and/or to ensuing context(s) of serial content, not yet broadcast to the child 11. Concurrent and/or ensuing context(s) may be determined by one or more processors (e.g., on the handheld device 10, within the tablet 13, or located remotely, e.g., including a server farm such as at 17a, 17b and 17c).

The child may then interact with audible cues 18b emanating from the handheld device 10 and/or visual and/or audible components of the serial content 14a, 14b by tapping 16a the handheld device 10 onto a desktop 16b, an opposing hand (especially a digit), or another solid surface (not shown). The timing of tapping, as well as tap location(s) on the handheld device may additionally be sensed by one or more IMUs (not visible within FIG. 1) located within the handheld device at 10. The tapping interaction 16a may, for example, result in instructions transmitted by the handheld device communication module 10 to the broadcast controller (e.g., tablet 13) to "go back" and replay a portion of content already broadcast (e.g., indicated using a single tap) or to skip over content and/or one or more contexts that are about to be played (e.g., with multiple taps where a number of taps may, for example, indicate how far to "fast forward" through content, or simply skip forward).

Figure 2:
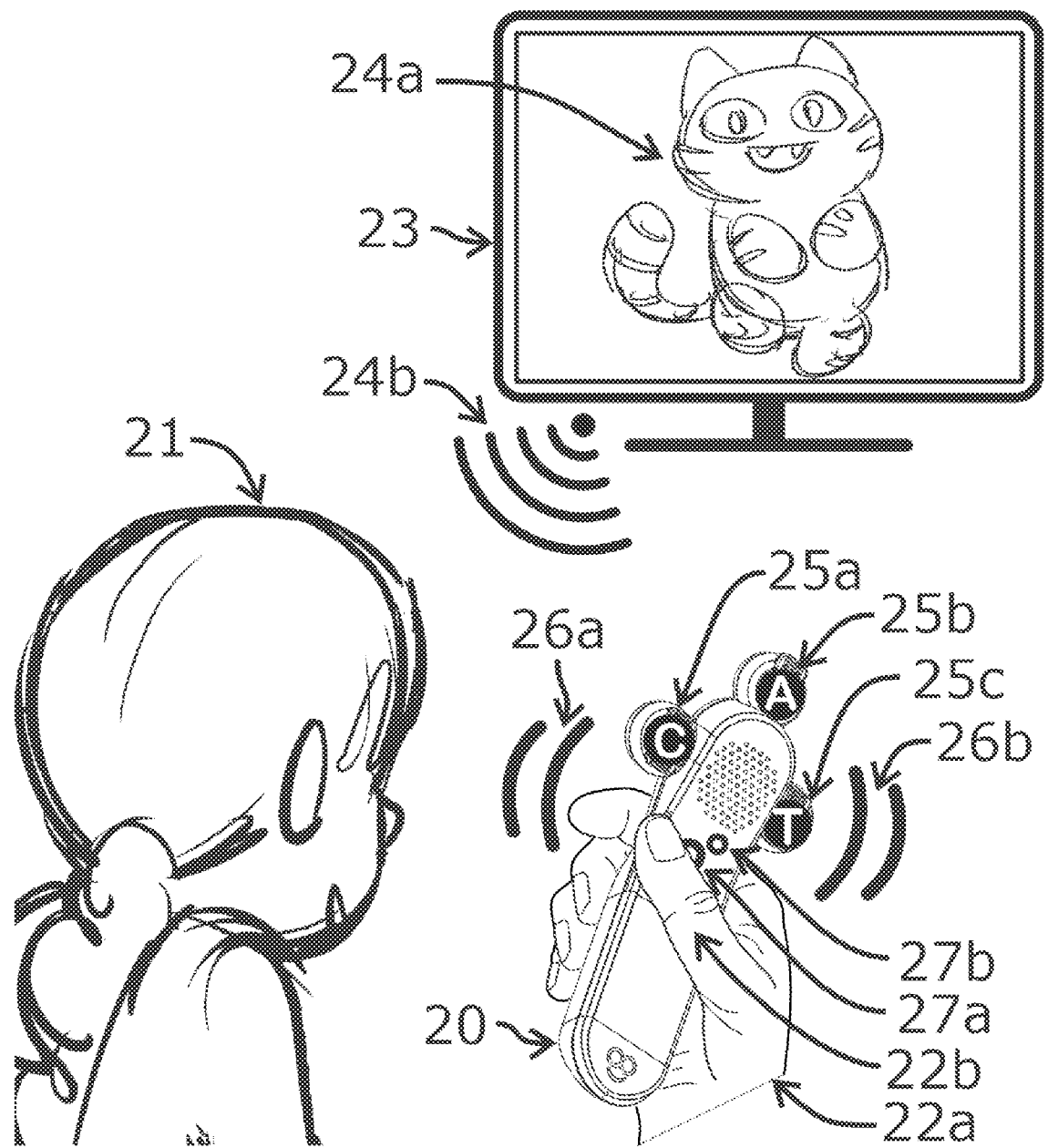
FIG. 2 shows video and aural content broadcast on a television viewed by a young child who controls content delivery by responding to visual cues associated with content context on handheld device displays via gesture movements of the handheld device.

FIG. 2 shows the sights 24a and sounds 24b of a cat broadcast on a television 23 being viewed by a young child 21. The delivery of the feline serial content may be controlled as a result of interactions between the child 21 and a portable device 20 held in the child's right hand 22a. In this example, handheld device interactions include broadcasting the letters "C" at 25a, "A" at 25b, and "T" at 25c on three spherical displays of the handheld device 20. Such visual interactions 25a, 25b, 25c using the handheld device may be a component of learning how to pronounce (e.g., especially involving consonant-vowel-consonant combinations of sounds) and/or to spell words associated with virtual objects.

In this exemplary case, the child 21 may indicate responses during interactions by shaking the handheld device 26a, 26b, sensed by one or more IMUs embedded within the device 20. For example, when displayed characters represent incorrect spellings of objects within the serial content, the child 21 may shake the handheld device 26a, 26b from side-to-side, indicating a negative (or "no") reaction to the displayed spelling. Conversely, when a correct spelling of an object associated with serial content context is displayed (e.g., "CAT" at 25a, 25b and 25c), an up-and-down motion 26a, 26b of the handheld device may indicate agreement (or "yes") with the displayed spelling. Agreement with a correct spelling may, for example, initiate instructions by the handheld device communication module to the content control device (e.g., television 23) to proceed to showing content that may contain new context(s).

Other responses by the child 21 may result in a range of content control actions. For example, if no significant movement of the handheld held device 20 is sensed for some time following an updating of the display to show a new spelling; an alerting sound, haptic vibrations and/or flashing of the display may be produced by the handheld device to indicate that a response by the child 21 is expected. If the child 21 responds affirmatively to an incorrect spelling, or if the child 21 responds negatively to a correct spelling, then instructions may be transmitted to the serial content control device to replay one or more portions of the serial content or to not skip over addition content (if available) with feline context(s).

Alternatively, or in addition, the child may interact using the handheld device 20 via one or more pushbuttons. In the configuration shown in FIG. 2, the buttons at 27a and 27b are designed to be readily pressed by the thumb 22b of the hand 22a holding the device. During interactions, different "meanings" (i.e., resulting in different actions) may be assigned to different buttons. For example, one button (e.g., 27a) may be used to indicate "yes" or "agree" to displayed questions and/or audible broadcasts related to content context(s). Conversely, a second button (e.g., 27b) may be used to indicate "no" or "disagree" to such queries, statements or prompts. Physical cues to distinguish such buttons may include different sized buttons (e.g., the button shown at 27a is larger that the button shown at 27b), different colored buttons, and/or different surface textures (e.g., that may be felt, even without looking).

Figure 3:
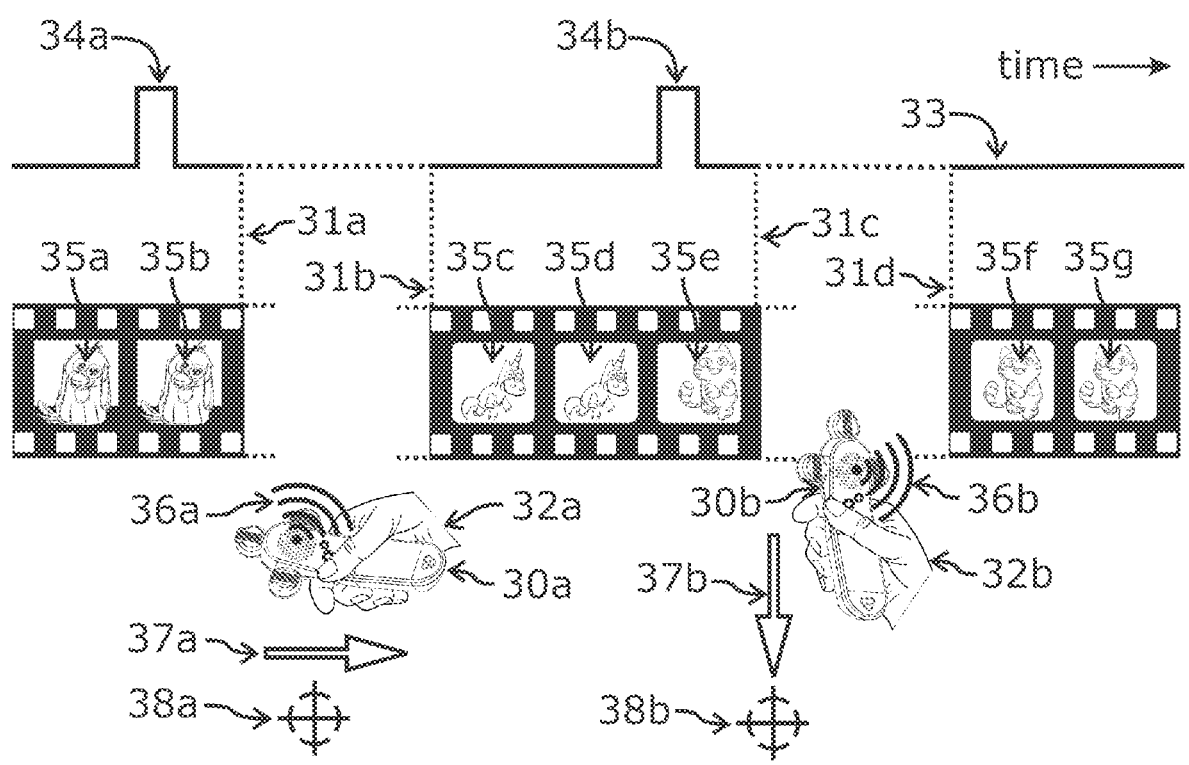
FIG. 3 illustrates an exemplary timeline of serial content delivery in which interrupt indications are embedded within the serial data stream, user interactions are facilitated by audio regarding content context(s) broadcast by the handheld device, and user responses that are a component to control content delivery are indicated by manipulating handheld device orientation relative to the gravitational pull of the earth.

FIG. 3 illustrates an exemplary timeline 33 of serial content delivery in which interrupt indications 34a, 34b (i.e., signalling times to potentially interact via a handheld device 30a, 30b regarding one or more content contexts) may be included with serial content data (e.g., to be decoded electronically, via firmware, or using software). Such interrupt indications may, for example, be embedded in an inaudible portion of an audio data channel, a non-visible portion of a video channel, or within a separate dataset of time stamps (e.g., elapsed times or number of frames since the beginning of content delivery) when interactions using the handheld device may be particularly viable and/or when the delivery of content may be paused (e.g., based on serial content context or an impending change in context) to initiate an interaction.

Within the exemplary timeline in FIG. 3, the first potential interrupt 34a signals an upcoming transition in serial content from cartoon images (that may also include sounds) of a dog at 35a and 35b, to those of a unicorn at 35c and 35d. Upon detecting the first interrupt 34a, the delivery of serial content may optionally be paused (i.e., between the time at 31a and the time at 31b) by the content delivery device or the handheld device (i.e., via its communication module) to signal the initiation of an interaction.

All user interactions (e.g., between 31a and 31b, as well as between 31c and 31d) during the timeline 33 in FIG. 3 include one or more acoustic prompts 36a, 36b from the handheld device (shown at 30a and additionally at 30b). The device may be manipulated using a hand 30a, 30b of the device user, where orientation 37a, 37b relative to the gravitational pull of the earth 38a, 38b may be used to signal intent by the device user.

During the first interaction (i.e., between the time at 31a and at 31b), the acoustic prompt may include asking if further viewing of the dog is desired. The handheld device may then be held (e.g., for a period exceeding about 0.5 seconds, depending on user preferences) approximately in the horizontal plane 37a (i.e., long axis of the handheld device 30a perpendicular to the gravitational pull of the earth 38a) to indicate no desire to view further canine content and to move on to new context(s). As a consequence, the handheld device 30a may transmit instructions (i.e., via its communication module) to switch content from the audiovisual images of a dog at 35a and 35b, to those of a unicorn at 35c and 35d. Audiovisual content may then continue until another potential interrupt signal 34b is detected, signalling a transition in content from viewing a unicorn at 35d to audiovisual content that includes cartoon images of a cat at 35e.

Similar to the first interrupt, the delivery of serial content may optionally be paused (i.e., during the time of the second interaction between 31c and 31d). During this time, the device user may be asked via one or more audio prompts at 36b from the handheld device at 30b whether further viewing and/or listening to a cat is desired. Manipulating (i.e., by a hand 32b) the handheld device 30b to about a vertical orientation (i.e., long axis of the handheld device parallel to the gravitational pull of the earth) for a minimum time (e.g., >0.5 seconds, depending on user preferences) may signal a desire to continue to view and/or to listen to feline content at 35f and 35g. Any number of additional potential interrupts may subsequently be included within the timeline of a serial content dataset.

Figure 4:
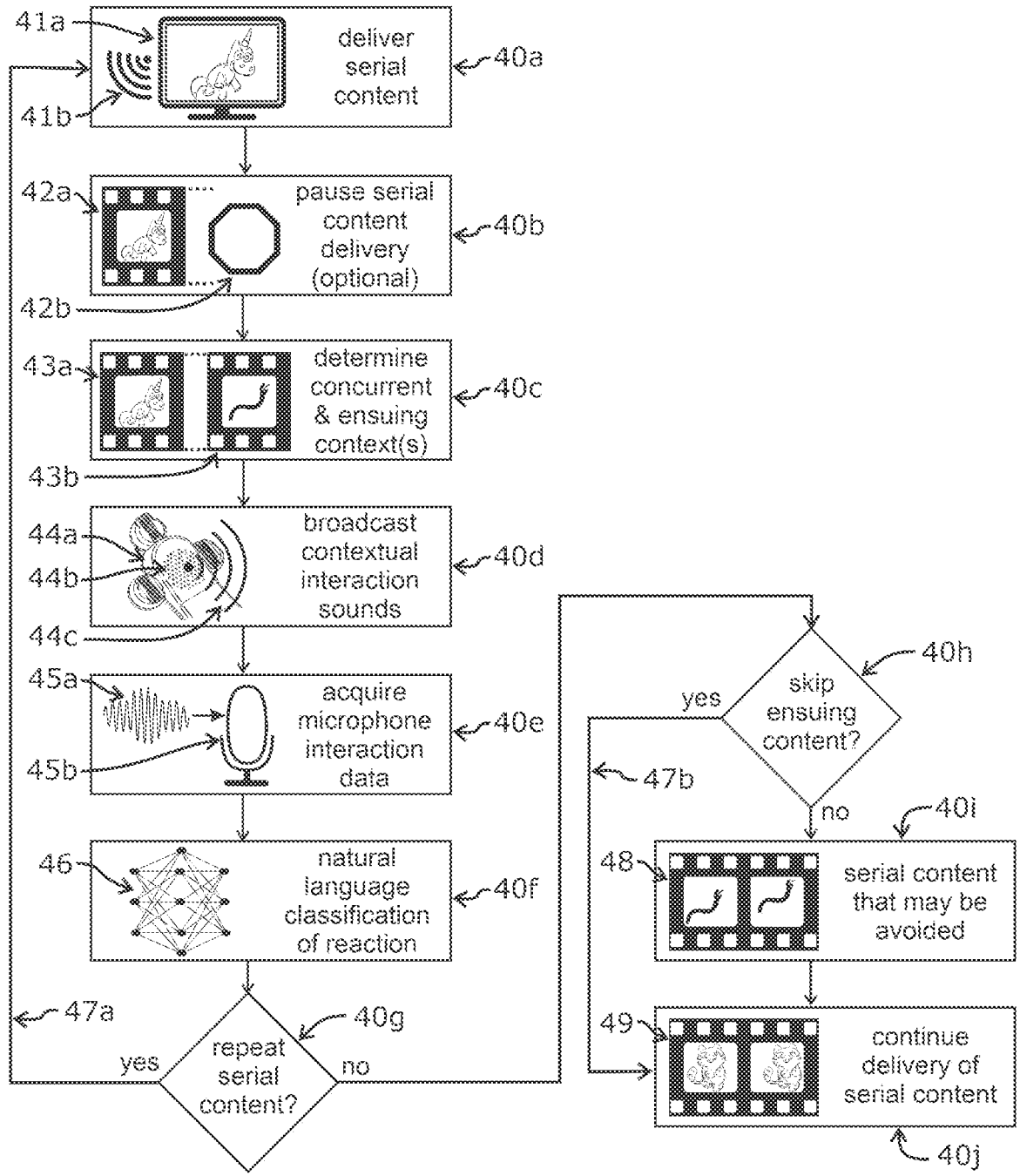
FIG. 4 is a flow diagram illustrating exemplary verbal interactions using a handheld device speaker and microphone regarding content broadcast on a television to determine if content should be repeated or if ensuing serial content (that includes images of a snake) should be skipped.

In the exemplary flow diagram shown in FIG. 4, visible 41a and audible 41b components of serial content (that includes cartoon images of a unicorn 42a) are broadcast to a handheld device user via a television 40a. Delivery of the serial content may optionally be paused or stopped at 42b (e.g., that may depend on additional predetermined factors including user preference) as an indication to initiate user interactions using a handheld device 40b. The context(s) of either or both of concurrent (i.e., involving a unicorn 43a) and ensuing (i.e., not yet shown to the user, involving a snake 43b) content may be classified by processes coordinated by the handheld device processor 40c. Based on one or both of the concurrent and ensuing context(s), the interaction may include audio prompts 44c emanating from a speaker 44b within the handheld device 44a directed at the handheld device user 40d.

Audible components 45a of the user's reaction may then be acquired using a microphone 45b embedded within the handheld device 40e. Audio recordings may then be classified by natural language processing 40f (e.g., that may include processing by a trained neural network 46). Based on the one or more classifications of user reaction(s), instructions may be transmitted by the handheld device to continue playing or repeat content at 47a that includes the concurrent context 40g.

Otherwise, based on the one or more classifications of user reaction(s), instructions may be transmitted by the handheld device to skip broadcasting of ensuing content 47b that may, for example, include one or more contexts that are offensive or fearful to the device user 40h. For example, content that includes images and/or sounds of snakes 48 may be avoided by an individual fearful of snakes 40i (e.g., suffering from ophidiophobia). Upon broadcasting or skipping content that includes a snake as a context 48, the broadcasting of serial content may proceed to include images of a cat 40j that may be broadcast until another interaction.

In the exemplary flow diagram shown in FIG. 5, visible 51a and audible 51c components of serial content are being delivered to a handheld device user via a tablet 50a. Serial content includes the rhythmic sights 51b and sounds 51c of beating a drum. In this exemplary scenario, the ability of a handheld device user to match the overall frequency (i.e., beat, rhythm or melody) of percussion instruments or, even more so, to react synchronously with the one or more musical instruments, may be assessed.

One or more contexts of broadcast content that includes a beating drum 52a as well as ensuing contexts (i.e., not yet shown to the handheld device user) involving striking a cymbal 52b may be determined by the handheld device and/or broadcast device processors 50b. Contexts may include measurements of intervals (i.e., mathematically, the inverse of frequencies) between beats. Haptic vibrations 53b may be generated on a handheld device 53a synchronously with the drumbeat of the serial content 52a. Such haptic vibrations 53b may be felt by a hand 53c of the handheld device user as both a stimulus for interaction, and to help teach about rhythm and melody within music 50c.

The user may react to haptic, acoustic and/or visual stimuli by tapping on the handheld device (e.g., with an opposing hand) or tapping the handheld device onto a solid surface (e.g., table or desk, as illustrated in FIG. 1). Such device movements and/or taps may be determined from an embedded IMU-based data stream that may include accelerometer (and/or gyroscopic and/or gravitational orientation) data recorded in three orthogonal axes 54a, 54b, 54c often denoted X, Y and Z 50d. In this instance, since key elements of the interaction involve intervals between handheld device taps (or movements), the magnitude of movements 55c may be computed according to equation 1 above, largely ignoring directional information within data streams 50e. Intervals between taps and/or larger movements of the handheld device by the device user 55a may be computed when the magnitude of IMU-based data streams 55c exceeds a predetermined threshold 55b.

The frequency and/or synchrony of handheld device taps or motions may be compared with the rhythm and/or melody of presented serial content 50f. If there is little or no correlation between the serial content and user reactions, then the handheld device may instruct the content delivery device to continue (or repeat) serial content involving a (relatively simple) drumbeat 56. On the other hand, if intervals substantially match and/or there is synchrony between presented serial content and user reactions 50g, the handheld device may instruct the content delivery device to skip additional percussion practice sessions 57 and move on to (more complex) serial content involving the playing of a guitar 50i.

If user reactions appear to indicate an awareness of a rhythm, but without a substantial match in beat, then the handheld device may instruct the content delivery device to broadcast serial content containing activities using another percussion instrument 50h. Additional rhythmic practice may be enacted by measuring handheld device taps and/or movements relative to those of one or more cymbals 58 within serial content (e.g., in a manner similar to that shown at 50e). Once the additional rhythm practice is complete, or if the additional practice was unnecessary 57, the handheld device (i.e., via its communication module) may instruct the broadcast device control of serial content to continue with more complex instruments or musical arrangements, such as the playing of the guitar 59.

Figure 6:
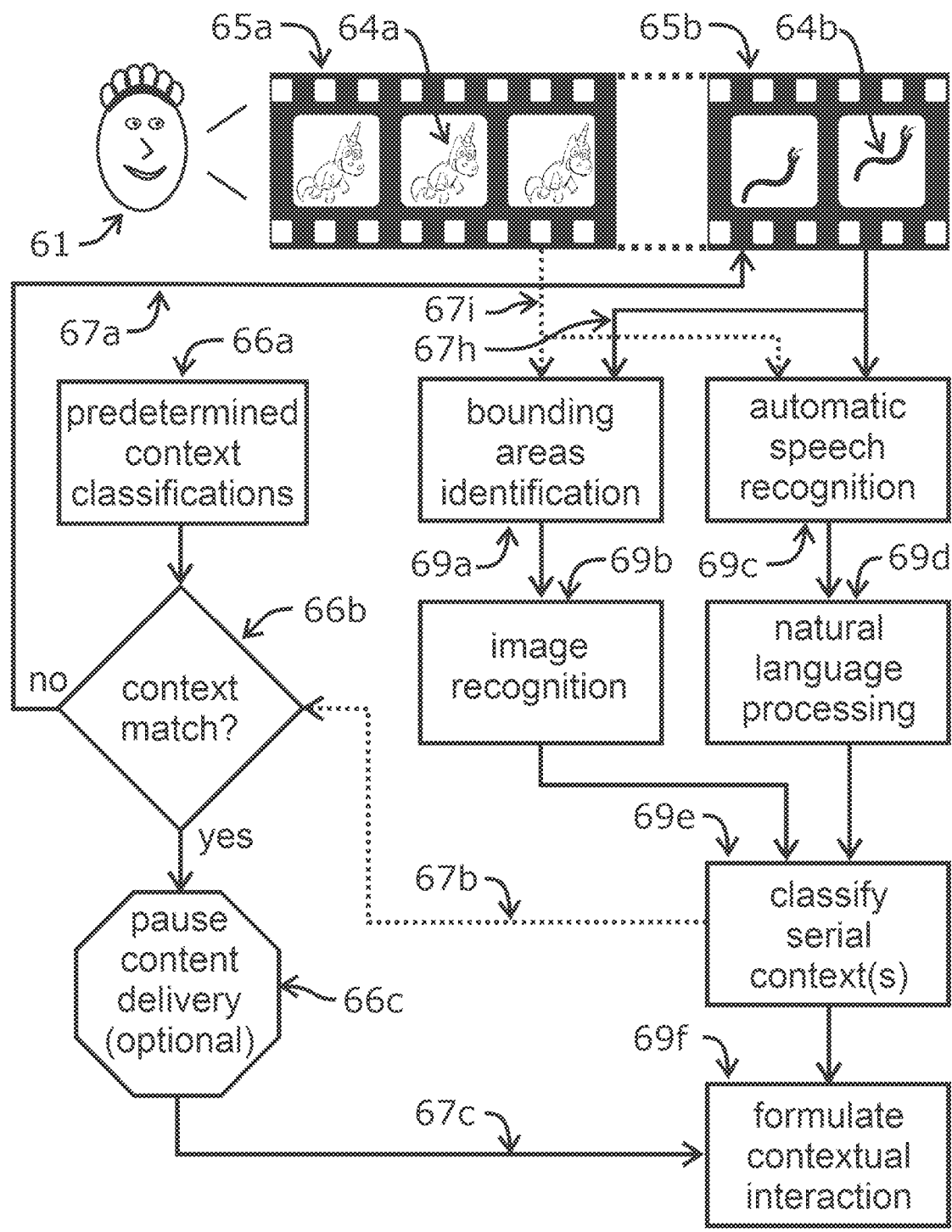
FIG. 6 illustrates exemplary computational processes to assess the context(s) of content being shown to a handheld device user as well as one or more ensuing content contexts (not yet broadcast) to determine if the delivery of serial content should be paused based on matching a predetermined context and an interaction initiated.

FIG. 6 is an organizational diagram illustrating exemplary computational processes to assess the contexts of content being shown to a handheld device user (i.e., concurrent contexts 65*a*) as well as contexts that are pending or that have not yet been shown (i.e., ensuing contexts 65*b*), to determine if the delivery of serial content should be interrupted (and optionally paused) based on a match with one or more predetermined contexts. In this scenario, the handheld device user 61 may view serial content 65*a* that includes cartoon images of a unicorn 64*a* moving across the screen of a viewing device (e.g., television and/or tablet, not shown).

One or more processors (e.g., within the handheld device, within the viewing device, and/or remotely located processors connected via telecommunications) may classify concurrent contexts based on content being broadcast at 65*a*. At the same time, the contexts of content that has not yet been broadcast (i.e., ensuing contexts at 65*b*) may also be analyzed (typically using the same hardware and software/firmware routines used to process concurrent content). In this case, the ensuing content 65*b* contains images and/or sounds of a snake 64*b* slithering across the screen.

The processing of both concurrent (shown as a dashed line at 67*i*) and ensuing (shown as a solid line at 67*h*) video images may include: 1) bounding areas identification (to identify objects within images) at 69*a*, 2) image recognition of those objects (typically using deep learning approaches) at 69*b*, and 3) classification of identified images to determine one or more contexts (typically also using neural network approaches) at 69*e* (in conjunction with audio analyses, if available). Within a parallel series of processing steps, audio processing may include: 1) automatic speech recognition at 69*c*, 2) natural language processing at 69*d*, and 3) classification of one or more contexts (in conjunction with video-based results, if available).

The classified contexts at 67*b* may be compared at 66*b* with one or more predetermined contexts at 66*a* that may, for example, include likes (e.g., images of unicorns), hobbies, educational goals, and/or dislikes (e.g., images of snakes) of the handheld device user 61. If there is no match between any predetermined contexts and (concurrent or ensuing) classified contexts, the broadcasting of serial content may continue uninterrupted 67*a*. If there is a match, then the delivery of serial content may optionally be paused at 66*c* to, for example, allow the user 61 to focus on interactions using the handheld device. Such interactions triggered at 67*c* due to one or more context matches may then include audio content and/or visual prompts on the handheld device (not illustrated in FIG. 6, see FIG. 7) that have been formulated based on the one or more classified contexts at 69*f*.

Figure 7:
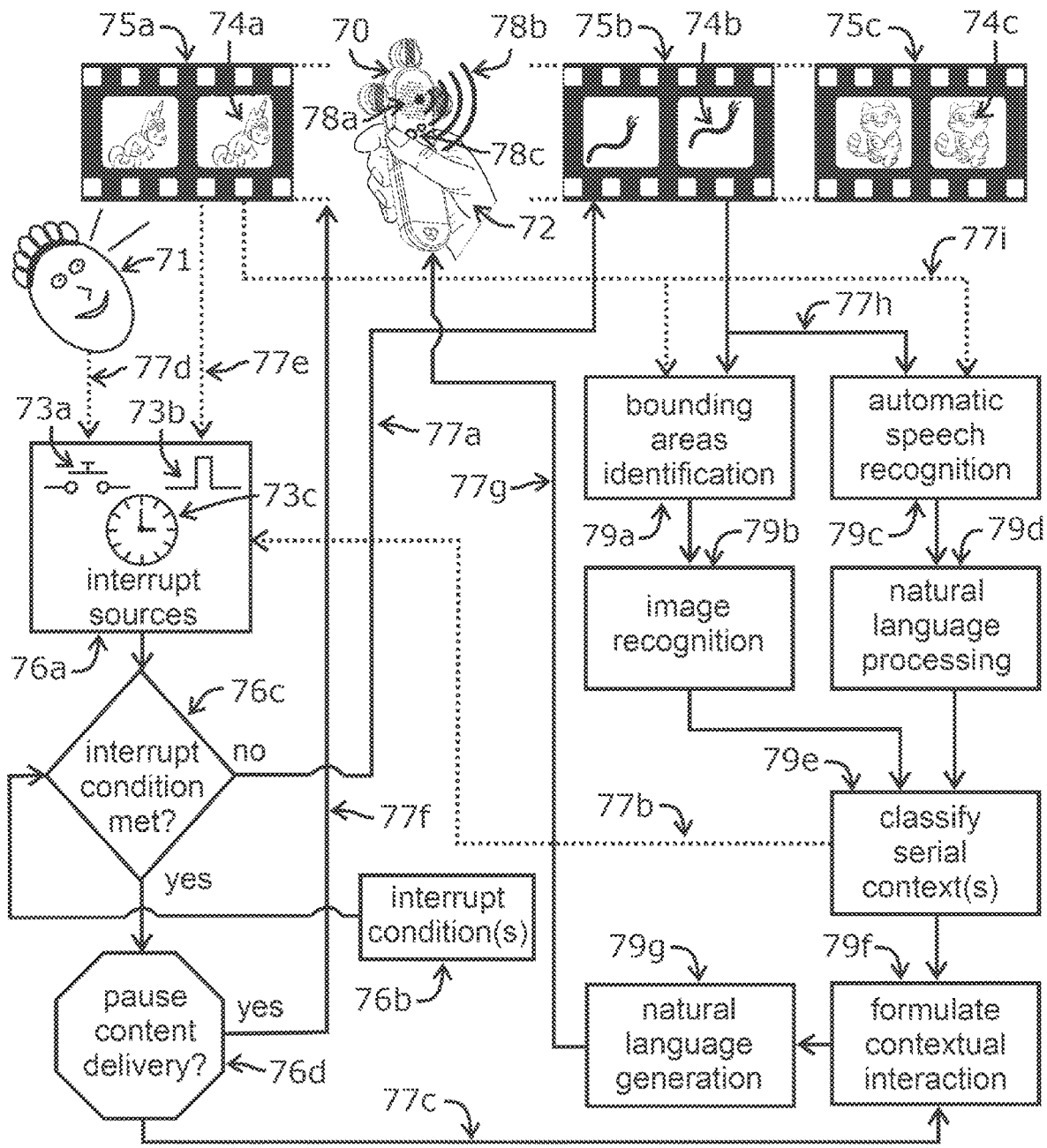
FIG. 7 expands the organizational diagram shown in FIG. 6 to include a range of different sources to trigger interrupting content delivery and generating interactive speech using a handheld device speaker based on current or ensuing context(s).

FIG. 7 expands the organizational diagram shown in FIG. 6 to include a range of sources to trigger the interrupting of content delivery 76*a* and generation of interactive sounds and/or speech 78*b* based on current or ensuing context(s) broadcast on a handheld device 70 speaker 78*a*. As introduced in FIG. 6, initial broadcasting of serial content 75*a* includes sounds and images of a unicorn 74*a* moving across the screen of a display device such as a television or tablet (not shown) viewed by a handheld device user 71. Concurrent content 77*i* as well as ensuing (i.e., future) serial content 77*h*, that includes the sounds and/or actions 75*b* of a snake 74*b*, may be processed individually or collectively to determine one or more serial content contexts. Objects within images may be processed by bounding area identification at 79*a*, image recognition at 79*b*, and classification (typically neural network based) to determine serial context. Along similar lines, sounds may be processed by automatic speech recognition at 79*c*, natural language processing at 79*d*, and context classification (independently or together with images).

FIG. 7 illustrates a number of potential interrupt sources 76*a* that may be employed individually or collectively to trigger the initiation of interactions with a user 71 of the handheld device 70. These include:

1) the user may signal 77*d* a desire to initiate an interaction by, for example, shaking or tapping the handheld device (sensed by an embedded IMU), or by pressing a pushbutton or contact switch 73*a* on the handheld device;
2) digital signals 73*b* may be embedded within the serial content (extracted via signal processing) and/or such signals may be acquired from a separate dataset (e.g., of frame counts and/or times of planned interrupts) 77*e*;
3) preferences may include enacting interrupts after an elapsed time (or range of times) of broadcasting serial content and/or at specific elapsed times 73*c* (e.g., using onboard clocks within the handheld device);
4) a match may be determined between any of a number of predetermined contexts (e.g., past user interests during interactions, hobbies, topics specified by the user) and a concurrent context that has been classified 77*b*; and/or
5) a match between any of a number of predetermined contexts (e.g., user likes, dislikes) and an ensuing classified context 77*b*.

In the absence of an active interrupt source or any of the various interrupt conditions 76*b* being met 76*c*, then the broadcasting of serial content may continue uninterrupted 77*f*. The presence of an interrupt condition may optionally 76*d* cause the broadcasting of serial content to be paused 77*f*. Further, the meeting of an interrupt condition 76*c* triggers formulating of an interaction on the handheld device 70 based on classified (concurrent and/or ensuing) content context(s) 79*f* produced using natural language generation 79*g*. Audio components of the interaction may then be broadcast 78*b* using a speaker 78*a* within the handheld device 70. User reactions may include manual manipulation 72 of the handheld device 70 to control device movement and/or orientation (detected within embedded IMU-based data streams), audio responses classified using routines available for automatic speech recognition at 79*c* and natural language processing at 79*d*, and/or pressing one or more pushbuttons 78*c* that may include user intents based on different temporal pushbutton sequences.

The handheld device may then transmit instructions (via a communication module, not shown) to a broadcast control device to control delivery of serial content based on user reactions. For example, if user 71 reactions indicate wanting to see more content involving unicorns 74*a*, then serial content involving unicorns 75*a* may be broadcast, extended or replayed. If user 71 reactions indicate a phobia or dislike of seeing snakes, then ensuing serial content 75*b* involving snakes slithering about 74*b* may be not shown, or display times shortened. Along similar lines, if there is a reaction indicating a desire to view cats, then intervening serial content may be bypassed to broadcast content 75*c* involving the antics of cats 74*c*.

The foregoing disclosure of the examples has been presented for purposes of illustration and description. It is not intended to be exhaustive or to limit the invention to the precise forms disclosed. Many variations and modifications of the examples described herein will be apparent to one of ordinary skill in the art in light of the above disclosure. It will be appreciated that the various components and features described with the particular examples may be added, deleted, and/or substituted with the other examples, depending upon the intended use of the examples.

Further, in describing representative examples, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method to control delivery of serial content based on human interaction with a handheld device, comprising:
   providing the handheld device operated by a human that includes a device processor, a device speaker operatively coupled to the device processor, a device inertial measurement unit operatively coupled to the device processor, and a device communication module operatively coupled to the device processor,
   wherein the device communication module controls delivery of the serial content to a content delivery device that is one or both of viewable and audible by the human;
   initiating, by one of the device communication module and a content delivery device processor of the content delivery device, the delivery of the serial content to the content delivery device;
   determining, by one or both of the device processor and the content delivery device processor, one or more serial content contexts based on one or both of concurrent serial content concurrent with the delivery of the serial content to the human and ensuing serial content available for delivery to the human after the concurrent serial content;
   broadcasting, by the device speaker, one or more interaction sounds related to the one or more serial content contexts;
   acquiring, by the device inertial measurement unit, human interaction data;
   determining, by the device processor, that the human interaction data include one or more human reactions to the one or more interaction sounds; and
   generating, by the device communication module, one or more instructions to control the delivery of the serial content based on the one or more human reactions,
   wherein the one or more instructions to control delivery of the serial content comprise one of delivering a previous portion of the serial content already delivered to the human, continuing delivery of the serial content after the pausing of the delivery of the serial content to the human, and delivering a future portion of the serial to the human content by not delivering a skipped portion of the serial content after the pausing of the serial content.

2. The method of claim 1, wherein the content delivery device is one or more of a television, a tablet, a mobile device, a display screen, a projection device, a holographic display device, an augmented reality headset, a headphone, earbuds, and a speaker.

3. The method of claim 1, wherein the delivery of the serial content to the content delivery device is paused during one or both of the broadcasting of the one or more interaction sounds and the acquiring of the human interaction data.

4. The method of claim 1, wherein determining the one or more serial content contexts by one or both of the device processor and the content delivery device processor includes using one or more of image recognition, speech recognition and natural language processing.

5. The method of claim 1, wherein the one or more interaction sounds comprise one or more of a word, a phrase, a sentence, a question, an interjection, an utterance, an animal sound, an alerting sound, a sound effect, a song, a musical beat, a musical tune, a musical score, a soundtrack, and a mimicking sound of the serial content.

6. The method of claim 1, wherein the one or more human reactions comprise one or more of a gesture movement of the handheld device, pointing the handheld device in a predetermined direction, tapping the handheld device with a digit of an opposing hand, tapping the handheld device with a striking object, tapping the handheld device at a predetermined tapping location on the handheld device, striking the handheld device against a solid object, and striking the handheld device against an additional handheld device.

7. The method of claim 1, wherein identifying that the one or more human reactions occur at a reaction rate that is one or both of approximately synchronous and similar in frequency to the broadcasting of the one or more interaction sounds influences the generating the one or more instructions to control the delivery of the serial content.

8. The method of claim 1, wherein the communication module includes one or more of an infrared transmitter, a radio frequency transmitter, a Wi-Fi transceiver and a Bluetooth transceiver.

9. The method of claim 1, wherein the device processor is instantiated with an artificial intelligence.

10. A method to control delivery of serial content based on human interaction with a handheld device, comprising:
    providing the handheld device operated by a human that includes a device processor, a device display operatively coupled to the device processor, a device inertial measurement unit operatively coupled to the device processor, and a device communication module operatively coupled to the device processor,
    wherein the device communication module controls delivery of the serial content to a content delivery device that is one or both of viewable and audible by the human;
    initiating, by one of the device communication module and a content delivery device processor of the content delivery device, the delivery of the serial content to the content delivery device;
    determining, by one or both of the device processor and the content delivery device processor, one or more serial content contexts based on one or both of concurrent serial content concurrent with the delivery of the serial content to the human and ensuing serial content available for delivery to the human after the concurrent serial content;

displaying, on the device display, one or more illumination patterns related to the one or more serial content contexts;

acquiring, by the device inertial measurement unit, human interaction data;

determining, by the device processor, that the human interaction data include one or more human reactions to the one or more illumination patterns; and generating, by the device communication module, one or more instructions to control the delivery of the serial content based on the one or more human reactions, wherein the one or more second instructions to control delivery of the serial content comprise one of delivering a previous portion of the serial content already delivered to the human, continuing delivery of the serial content after the pausing of the delivery of the serial content to the human, and delivering a future portion of the serial to the human content by not delivering a skipped portion of the serial content after the pausing of the serial content.

11. The method of claim 10, wherein the one or more illumination patterns comprise one or more of one or more solid colored lights, one or more changing colored lights, one or more flashing lights, scrolling lights, one or more characters, one or more symbols, one or more drawings, and one or more images.

12. The method of claim 10, wherein the one or more human reactions comprise one or more of a gesture movement of the handheld device, pointing the handheld device in a predetermined direction, tapping the handheld device with a digit of an opposing hand, tapping the handheld device with a striking object, tapping the handheld device at a predetermined tapping location on the handheld device, striking the handheld device against a solid object, and striking the handheld device against an additional handheld device.

13. The method of claim 10, wherein the delivery of the serial content to the content delivery device is paused during one or both of the displaying of the one or more illumination patterns and the acquiring of the human interaction data.

14. A handheld device to control delivery of serial content, comprising:

a device body configured to be held by a hand of a human;

electronic circuitry within the device body that includes a device processor;

at least one inertial measurement unit within the device body operatively coupled to the device processor;

a device communication module operatively coupled to the device processor configured to control delivery of the serial content to a content delivery device that is one or both of viewable and audible by the human; and a device speaker operatively coupled to the device processor, wherein the device processor is configured to:

transmit, using the device communication module, one or more first instructions to the content delivery device to initiate the delivery of the serial content;

determine, using the device communication module, one or more serial content contexts based on one or both of concurrent serial content concurrent with the delivery of the serial content to the human and ensuing serial content available for delivery to the human after the concurrent serial content;

play one or more interaction sounds related to the one or more serial content contexts on the device speaker;

acquire human interaction data from the device inertial measurement unit;

determine that the human interaction data include one or more human reactions to the one or more interaction sounds; and transmit, using the device communication module, one or more second instructions to control the delivery of the serial content based on the one or more human reactions, wherein the one or more second instructions to control delivery of the serial content comprise one of delivering a previous portion of the serial content already delivered to the human, continuing delivery of the serial content after the pausing of the delivery of the serial content to the human, and delivering a future portion of the serial to the human content by not delivering a skipped portion of the serial content after the pausing of the serial content.

15. The device of claim 14, wherein the content delivery device is one or more of a television, a tablet, a mobile device, a display screen, a projection device, a holographic display device, an augmented reality headset, a headphone, earbuds, and a speaker.

16. The device of claim 14, wherein the communication module includes one or more of an infrared transmitter, a radio frequency transmitter, a Wi-Fi transceiver and a Bluetooth transceiver.

17. The device of claim 14, wherein the device processor is instantiated with an artificial intelligence generating a personality that is knowledgeable about the human.

18. The device of claim 17, wherein the artificial intelligence generates a voice familiar to the human on the device speaker.

* * * * *